(12) United States Patent
Gautier

(10) Patent No.: US 7,166,945 B2
(45) Date of Patent: Jan. 23, 2007

(54) ROTATING ELECTRICAL MACHINE SUCH AS AN ALTERNATOR ADAPTABLE TO DIFFERENT TYPES OF MOTOR VEHICLES ENGINES

(75) Inventor: Jean Gautier, St Barthélémy D'Anjou (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/484,348

(22) PCT Filed: Jul. 31, 2002

(86) PCT No.: PCT/FR02/02767

§ 371 (c)(1),
(2), (4) Date: Jan. 21, 2004

(87) PCT Pub. No.: WO03/012960

PCT Pub. Date: Feb. 13, 2003

(65) Prior Publication Data

US 2004/0164630 A1    Aug. 26, 2004

(30) Foreign Application Priority Data

Jul. 31, 2001    (FR) .................... 01 10271

(51) Int. Cl.
*H02K 5/16* (2006.01)
*H02K 7/08* (2006.01)

(52) U.S. Cl. .......................... 310/90; 310/89
(58) Field of Classification Search ........... 310/89, 310/85, 91; 248/689, 657

See application file for complete search history.

(56) References Cited

U.S. PATENT DOCUMENTS

| 3,652,044 | A | * | 3/1972 | Manross ................ 248/657 |
| 5,705,870 | A | * | 1/1998 | Thomsen et al. ........ 310/91 |
| 2002/0017823 | A1 | * | 2/2002 | Asao ..................... 310/62 |
| 2002/0117920 | A1 | * | 8/2002 | Trowbridge ............ 310/89 |

FOREIGN PATENT DOCUMENTS

| EP | 0 281 811 A | 9/1988 |
| FR | 1 056 643 A | 3/1954 |
| FR | 2 793 300 A | 11/2000 |
| WO | WO 8602788 A1 * | 5/1986 |
| WO | WO 87/06401 | 10/1987 |

* cited by examiner

Primary Examiner—Burton S. Mullins
Assistant Examiner—Erik Preston
(74) Attorney, Agent, or Firm—Berenato, White & Stavish

(57) ABSTRACT

A rotary electrical machine such as an alternator, in particular for a motor vehicle. This machine is adaptable to various types of motor vehicle engine and comprises removable lugs (16) for fixing the machine to a fixed support such as a support secured to the vehicle engine and which are able to be mounted on the peripheral face of at least the front bearing (2), each between two lateral support faces (14) provided on this peripheral surface at a predetermined distance from each other in the peripheral direction of the bearing. The lateral support face (14) is formed by the lateral face of an area of protruding material (12), which constitutes an alternator assembly area, and the fixing lug (16) is disposed between two lateral support faces (14) opposite each other and belonging to two adjacent protruding areas (12).

15 Claims, 3 Drawing Sheets

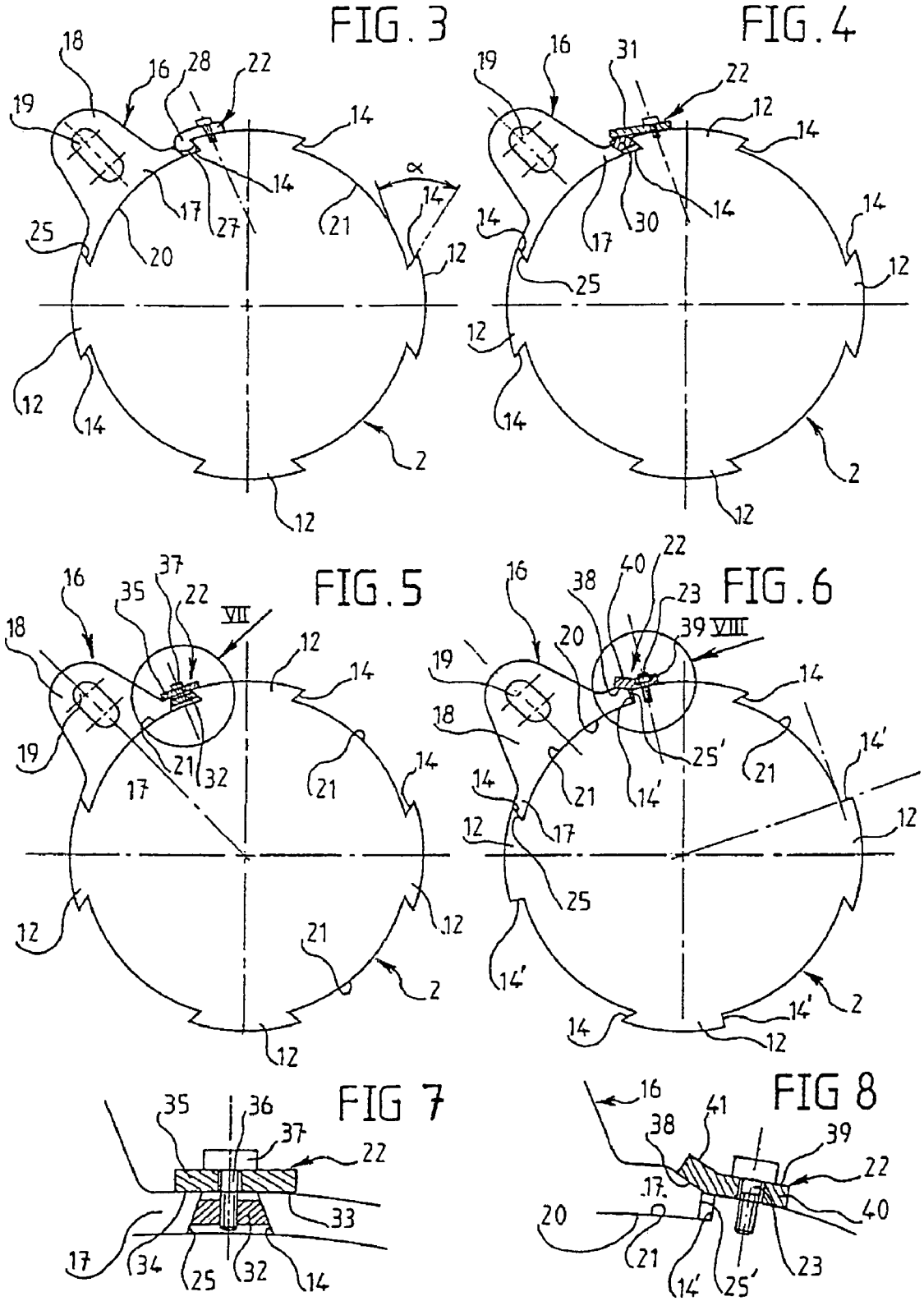

ROTATING ELECTRICAL MACHINE SUCH AS AN ALTERNATOR ADAPTABLE TO DIFFERENT TYPES OF MOTOR VEHICLES ENGINES

TECHNICAL FIELD OF THE INVENTION

The invention concerns a rotary electrical machine such as an alternator, in particular for a motor vehicle, adaptable to various motor vehicle engines, of the type comprising a casing enclosing a stator and a rotor whose spindle is supported by front and rear bearings and carries a pulley driven by means of a belt and removable fixing lugs able to cooperate with a support fixed to the vehicle engine, and which are able to be mounted on the peripheral face of at least the front bearing, each between two support faces provided on this peripheral face at a predetermined distance from each other in the peripheral direction of the bearing.

PRIOR ART

Alternators of this type are already known. Their main field of application is the-automobile market relating to spare parts, that is to say replacement parts, and small production runs. This is because, by virtue of their removable fixing lugs, alternators are adaptable to various types of motor vehicle engine.

French patent application N° 2 793 300 describes an alternator as indicated above, in which there is machined, in a protruding area on the peripheral surfaces of the front and rear bearings, a dovetail groove which extends parallel to the axis of the two bearings and which is intended to receive two fixing lugs.

These lugs are able to be moved by sliding in this groove and can be immobilised therein at an axial distance from each other by clamping screws passing through holes formed in the lateral walls of the dovetail grooves. The front bearing is also configured so as to allow the mounting in various angular positions of a lug for tensioning the drive belt. For this purpose, the front bearing comprises a peripheral rib in the form of an arc of a circle and, in front of the lateral face of this rib, which is oriented towards the pulley and extends radially, an axial support face for the tensioning lug. This lug can be moved angularly on this support face and can be immobilised in various angular positions by screws passing through the lug and engaging in threaded holes in the radial rib face.

Because of their single dovetail groove in the bearings, the alternator known through this French patent has the major drawback of not being able to allow a choice of the relative position of the rear connections, which is becoming more and more critical because of the constraints of location and size of the alternators in their environment. According to the vehicle, the position of the $B^+$ output terminal of the alternator may have a different angular position.

The peripheral rib in the form of an arc of a circle of the aforementioned known alternator constitutes a known obstacle to producing several protruding areas regularly distributed angularly on the external periphery of the front and rear bearings of the alternator.

The aforementioned alternator also has the drawback of not allowing permutation of the fixing lugs with the belt tensioning lug. This is because the fixing lugs inserted in the groove in the protrusion are designed to bear the major part of the weight of the alternator whilst the belt tensioning lug is carried by the peripheral rib in the form of an arc of a circle, not designed to bear the weight of the machine by means of fixing lugs. Thus the alternator described in the aforementioned patent application can find an application only for alternators necessarily comprising at least one belt tensioning lug. This alternator can therefore not be used for motor vehicles in which the alternator does not have a belt tensioning lug but only three or four fixing lugs. In this case, a device external to the alternator effects the tensioning of the belt.

OBJECT OF THE INVENTION

The aim of the present invention is to propose an alternator of the type indicated above which mitigates the drawbacks of the known alternators which have just been stated and is adapted to the many applications in the field of motor vehicles, required by the market consisting of replacement parts and short production runs.

For this purpose it proposes a rotary electrical machine such as an alternator, in particular for motor vehicles, adaptable to various types of motor vehicle engines and comprising a casing enclosing a stator and a rotor whose spindle is supported in front and rear bearings and carries a pulley for driving by means of a belt, and removable lugs for fixing the machine to a fixed support such as a support secured to the vehicle engine and which are able to be mounted on the peripheral face of at least the front bearing, each between two lateral support faces provided on this peripheral surface at a predetermined distance from each other in the peripheral direction of the bearing, in which an aforementioned lateral support face is formed by the lateral face of an area of protruding material on the external peripheral surface of the bearing, and in that an aforementioned fixing lug is disposed between two lateral support faces opposite each other and belonging to two adjacent protruding areas.

Thus the invention proposed makes it possible to choose the relative position of the rear connections of the alternator in order to facilitate its connection in the motor vehicle. The invention also has the advantage of offering the possibility of choosing the location where it is wished to put the fixing lugs on the external peripheral surface of the bearing. Another advantage according to the invention consists of offering the possibility of using only fixing lugs or again using fixing lugs in combination with at least one belt tensioning lug.

The invention is advantageously supplemented by the various following characteristics, taken alone or in all their technically possible combinations:

- the two lateral support faces and the peripheral surface portion of the machine, between the two lateral faces, constitute a runner for receiving and positioning a fixing lug,
- a protruding area is formed by an area serving for assembling the machine,
- an aforementioned bearing carries on its external peripheral surface a multitude of protruding areas delimiting a plurality of runners advantageously distributed equidistantly,
- a fixing lug comprises a base part by means of which the lug engages in the positioning runner and a top part for fixing to the aforementioned fixed support,
- a fixing lug is produced in the form of a single piece whose base and top parts are constituent parts,
- the base and top parts are separate pieces, able to be assembled for forming a fixing lug, a fixing lug is fixed in its positioning runner by a clamp device bearing through one part on the base of the fixing lug and through another part on the adjacent protruding area, the base of the fixing lug has a width less than the width of the runner intended for receiving it and in that the fixing clamp device comprises an element in the form of a wedge which engages in the gap created when the base is pushed in abutment against the other support face and provides by a wedging effect the immobilisation of the base in its runner when the fixing screws are tightened, the clamp device has the general shape of an L, one arm of which forms the aforementioned wedge element whilst the other arm comes into abutment on the protruding area of the periphery of the bearing, the clamp device comprises a piece forming a separate wedge and a clamping plate coming into abutment on the protruding area and the piece forming a wedge, the clamp device comprises a piece forming a wedge of trapezoidal shape and a clamping plate coming into abutment on the base of the lug and the protruding area and in that the wedging effect is produced by a clamping screw passing through the plate and the wedge piece and during tightening drawing the wedge piece towards the plate, the clamp device comprises a clamping plate, part of which comes into abutment on the protruding area whilst another part comes into abutment on an inclined surface forming a ramp configured so as to produce a force pushing the base of the clamp against the opposite runner support face when the plate part is clamped against the protruding area, a lug base has, in the plane of its receiving runner, the general shape of a U so as to leave free, in its central part, the ventilation holes formed in the peripheral wall of the bearing, a lug base comprises an aperture for leaving free the ventilation holes formed in the peripheral wall of the bearing, the surface portions of the clamp device and of the fixing lug base which are in abutment on each other are notched, the notches advantageously extending perpendicularly to the axis of the machine in order to improve the axial immobilisation of the fixing lugs, the face for placing the base of a fixing lug on the peripheral surface of the bearing has a curvature corresponding to that of the surface portion of the bearing surface between the two lateral support faces.

SUMMARY DESCRIPTION OF THE DRAWINGS

Other characteristics and advantages of the invention will emerge clearly from the description which is given below, by way of indication and in no way limiting, with reference to the accompanying drawings, in which:

FIGS. 3 to 6 are schematic views, similar to FIG. 2, of four versions of an embodiment of the mounting of a removable fixing lug according to the invention;

FIG. 7 is a detail view, to a larger scale, of the area encircled at VII in FIG. 5;

FIG. 8 is a detail view, to a larger scale, of the area encircled at VIII in FIG. 6;

DESCRIPTION OF PREFERENTIAL EMBODIMENTS OF THE INVENTION

Figure 1:
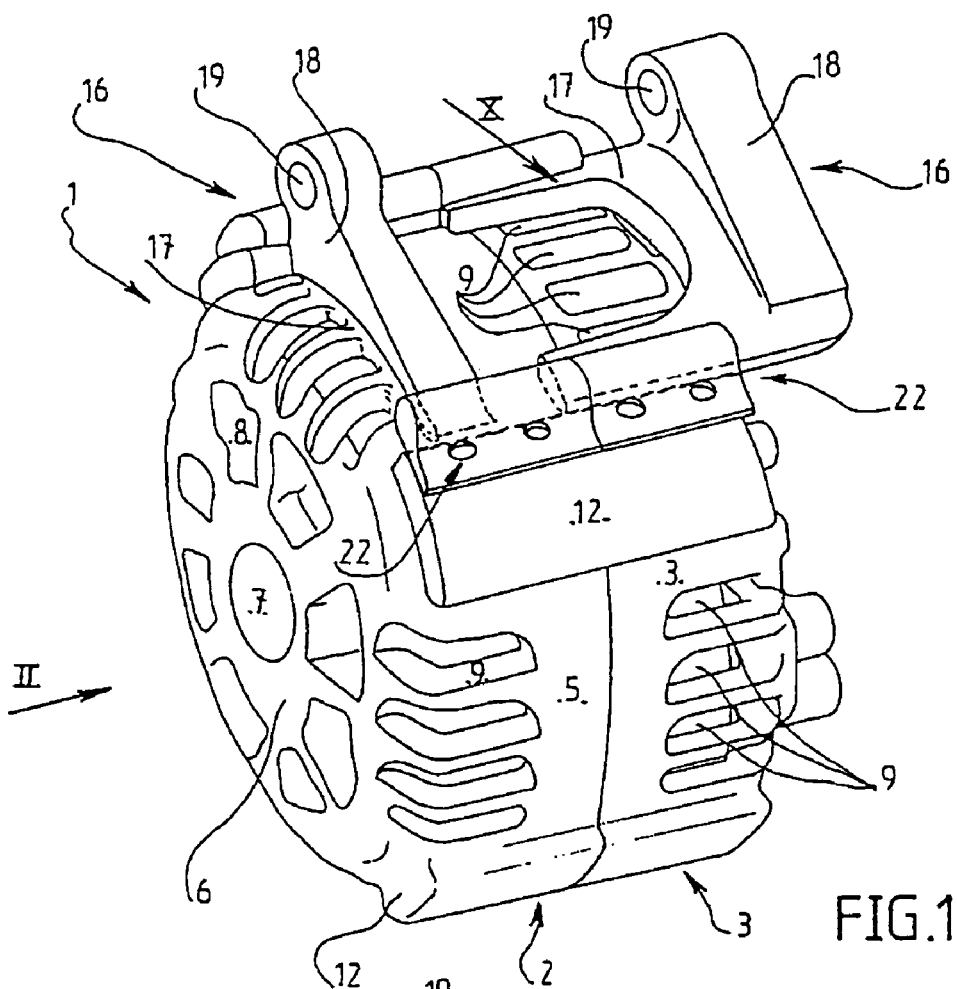
FIG. 1 is a perspective view of the casing of an alternator according to the invention.
Figure 2:
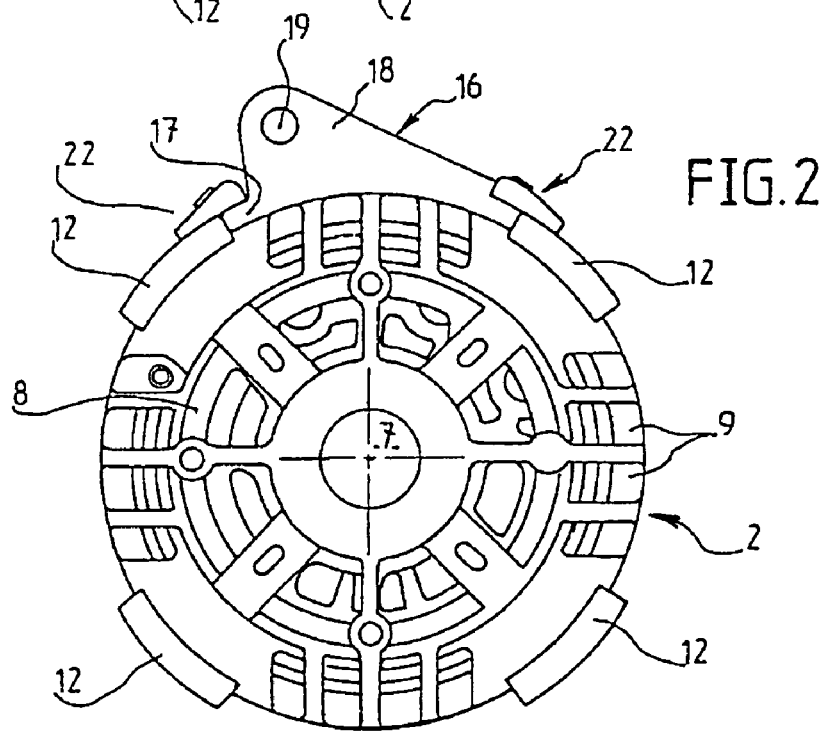
FIG. 2 is a view in the direction of the arrow II in FIG. 1.

FIG. 1 shows a casing designated by the general reference 1 of an alternator for a motor vehicle. This casing encloses, in a manner known per se, a stator and a rotor and associated devices. The alternator structure, inside the casing, will not be described in more detail since the invention does not relate to it.

The casing 1 is formed by the assembly of front 2 and rear 3 bearings intended, in a manner known per se, to support the spindle of the alternator rotor.

As shown in particular in FIG. 1, each bearing has a conventional configuration, that is to say it has the form of a cup comprising a cylindrical peripheral wall 5 and a bottom wall 6 at the centre of which is situated the passage orifice 7 for the rotor shaft, surrounded by a ring of passage orifices 8 for the flow of a cooling fluid. In the peripheral part 5 and the adjacent part of the bottom 1 there are formed four series of lateral holes 9 for discharge of the cooling fluid.

The bearings also carry, on their cylindrical peripheral face 5, distributed angularly in an equidistant fashion, four areas of protruding materials 12, which advantageously constitute the assembly areas for the alternator through which there pass the tie rods intended to fix the front and rear bearings. An assembly area can also, where necessary, be intended for fixing the stator. These protruding areas 12 extend parallel to the axis of each bearing and the areas 12 of one bearing are aligned with the areas 12 of the other. Thus, by using the pre-existing assembly areas, the radial ventilation holes are not obstructed, which guarantees optimum cooling of the alternator.

According to an essential aspect of the invention, these protruding areas 12 are used to make the casing 1 and thus the alternator adaptable to various types of motor vehicle engine. As shown in particular by FIGS. 3 to 6, for this purpose the lateral faces 14 of the protruding areas 12 are configured so as to be able to position, between the opposite faces 14 of two adjacent protruding areas 12, a lug 16 for fixing the casing to a support of the motor vehicle engine or directly to this engine. It should be noted that the lugs 12 can be used either as fixing lugs or as lugs for tensioning the belt driving the conventional pulley, known per se and therefore not depicted.

Figure 10:
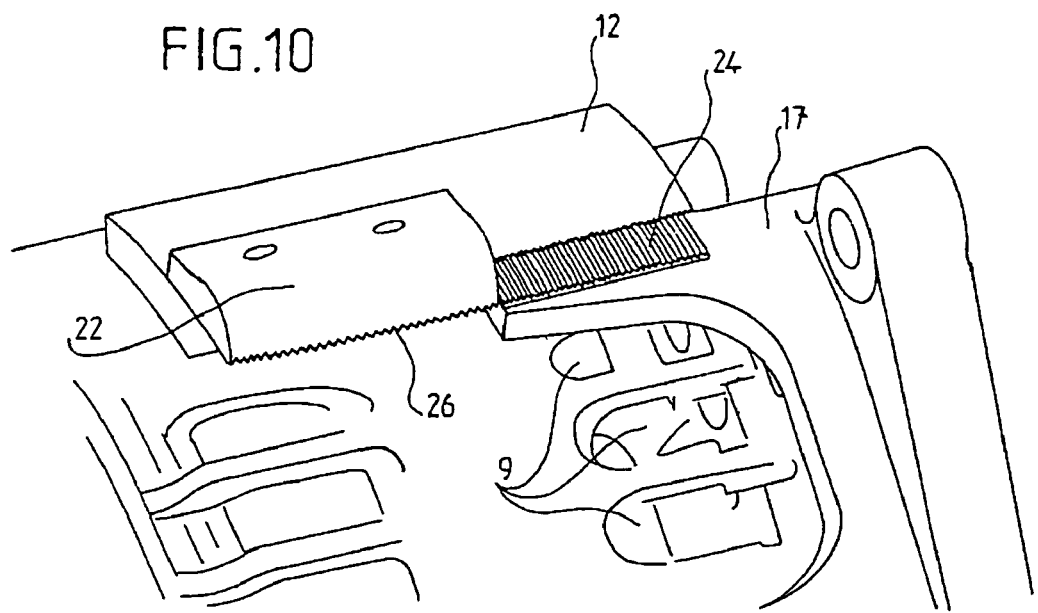
FIG. 10 is a view to a larger scale of the part indicated at X in FIG. 1.

As can be seen in the figures, a lug 16 according to the invention which is thus removable is composed of a base part 17 and a top part 18. The base part 17 provides the interface with the bearing and is intended to engage in the corresponding two lateral faces 14 of the two protruding areas 12 adjacent to the periphery of the bearing. The face 20 for placing the base 17 of the lug on the peripheral surface 5 of the bearing has a curvature corresponding to that of the surface portion 21 of the surface 5 between the two lateral support faces 14. The base enables the lug to slide in the runner formed in the portion of the peripheral face 21 of the bearing and of the two lateral faces 14 of the two protrusions 12. The base 17 comprises, for its final fixing, notched lines, depicted at 24 in FIG. 10, perpendicular to the axis of the alternator, on the top of the base cooperating with fixing members 12 which are described below. The length, in the axial direction, of the sliding base 17 of the lug depends on the axial offset of the lug, as can be seen in FIG. 1, but must allow secure final fixing of the lug on the bearing and at the same time leave clear the outlet holes 9. As shown in FIG. 1, the lug base 17 can have, in the plane parallel to the runners, a U-shaped profile, the external edges of the arms cooperating with the support faces 14. By virtue of this profile, the holes 9 can remain clear.

Figure 9:
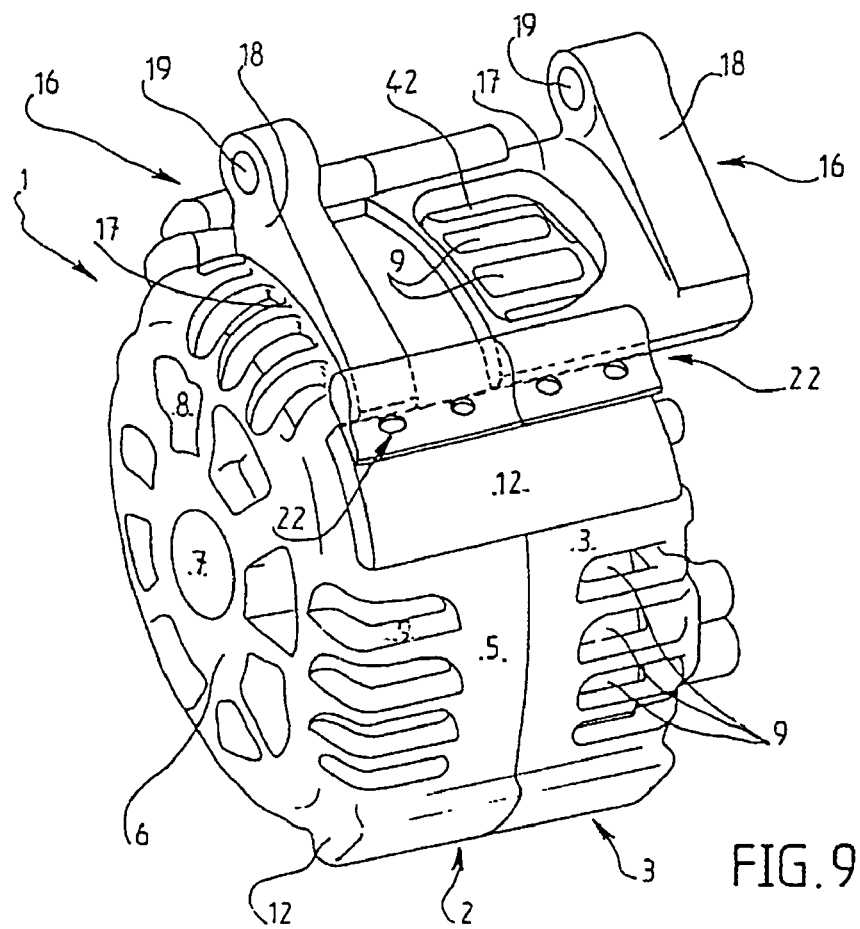
FIG. 9 is a perspective view of a variant embodiment of a fixing lug according to the invention.

FIG. 9 illustrates a variant embodiment of a fixing lug 16 according to the invention. In this case, the lug base 17 is provided with an aperture 42 which leaves the holes 9 clear.

The top part 18 of a lug 16 provides the interface with the engine of the motor vehicle. It is provided with a hole 19 for fixing it to the support of this engine, circular in shape for the fixing lugs as depicted in FIGS. 1, 2, 9 or 10, or oblong for the belt tensioning lugs as depicted in FIGS. 3 to 6. Naturally the shape of the holes 9 for the fixing or belt tensioning lugs can have shapes different from those described above. Thus, for example, the belt tensioning lugs can also have threaded or smooth circular holes 19. The lug may be different from one application to another according to the angular position, the height of the axis, the diameter of the bore and the thickness of its hub, which makes it necessary to have available a certain number of different lugs for covering the various cases of application. It should be noted that the lugs of the front and rear bearings are interchangeable and that the base and top parts may belong to the same piece or be two preassembled pieces.

The adjustment of the position of a fixing lug 16 or a belt tensioning lug in its runner and its final fixing in the appropriate position on the support bearing is effected by means of a clamp 22 which is placed so as to laterally cover the lug 15 to be fixed on the part of the bearing external to the cover, that is to say the external surface of the protruding area 12 in the vicinity of the runner. The clamp is fixed to the bearing by means of at least one screw 23 located in threads formed in the protruding area 12. Advantageously there may be a notched area. The internal surface of the part of the flange which comes into abutment on the notched area 24 on the top of the lug base 17 is notched as indicated at 26 in FIG. 10, so as to correspond to the notches on the base. The coinciding of the notched parts of the lug and flange is facilitated by a clearance or an oblong shape of the holes in the clamp, making it possible when a screw is tightened to slightly move the clamp. Thus the lug will also be positioned exactly at the required place. In this way the axial immobilisation of the fixing lugs is ensured.

FIGS. 3 to 6 show four possibilities of a fixing of a lug 16 in a runner of a front or rear bearing.

In the solution depicted in FIG. 3, the two lateral faces 14 of the runner form an angle α with the bottom 21 of the runner, which is less than or equal to 90°.

The two lateral faces 25 of the base 17 of the lug 16 have an inclination corresponding to that of the faces 14, but the width of the runner of the bearing is greater than the width of the base 17. Thus, when the lug is placed in its runner, one lateral face 25 is pressed on a support face 14 of the bearing. However, on the other hand, there exists a clearance 27 for example of several millimetres between the other lateral face 25 of the base and the corresponding support face 14 of the runner.

In order to fix the base 17 of the lug 16 in the bearing runner, a clamp 22 is used which has on one side a projecting portion in the form of a wedge 28 which engages in the gap 27 between the two separated faces 25 and 14 and, by a wedging effect, ensures the locking of the base 17 of the lug 16 in the runner when the screws 23 are clamped. According to its length, the clamp can comprise an appropriate number of fixing screws. Advantageously, the orientation of the screws is not radial and the axis of the screws forms with the peripheral surface of the tangent to the surface of the protrusion 12 on the side opposite to that of the face 14 an angle of less than 90°.

Advantageously, according to another embodiment of the invention, the two faces 14 of two adjacent protrusions 12 form a runner for a fixing lug 16 having different angles. On the one hand, the angle α, previously described, formed by the lateral face 14 of the runner with the bottom 21 of the runner is less than 90° for the side of the runner opposite to that carrying the flange 22 and, on the other hand, the angle α formed by the side of the runner carrying the flange 22 is equal to or less than 90°. The face 14 cooperating with the fixing flange 22 has a roughly radial, or even radial, direction, which has the advantage of radially guiding the flange 22 well when the screws 23 are screwed and thus improving the locking of the fixing lug 16 by better abutment of the clamp 22 on the face 25 of the facing lug 16.

Advantageously, whatever the embodiment, the two lateral faces 25 of the base 17 of the lug 16 have an inclination corresponding to that of the face 14 opposite to that carrying the clamp. Thus it is possible to insert the fixing lugs in the groove indifferently in one of the two possible directions in the axial direction of the groove.

Advantageously, the material used for producing the clamp is a sintered steel which has the characteristic of being of low elasticity and economical.

The fixing solution depicted in FIG. 4 corresponds in its principle to the solution depicted in FIG. 3. The only appreciable difference lies in the fact that the part of the wedge 28 is now formed by a separate piece 30 which will be pushed into the gap 27 by a clamp plate 31, when the screws 23 are tightened.

Fixing by means of a wedge has the advantage that there is added to the fixing by pressure a lateral component due to the wedging forces exerted. Advantageously, the material used for the form of the wedge clamp incorporated could be based on steel, and hence there will result a smaller space requirement than with a choice of material made from aluminium alloy.

FIG. 5 illustrates a method of fixing by means of a clamp 22 in the form of a plate 35 which cooperates with a member in the form of a wedge with a trapezoidal cross-section 32, as can be seen in more detail in FIG. 7. In this embodiment, the lateral support surface 25 of the lug base 17 on the same side as the application of the clamp plate 35 has an inclination which is opposite to that of the support face 14 of the runner. When it is wished to position the lug 16 in its runner, the lateral face 25 of the lug base 17 and the corresponding support face 14 of the runner are put in abutment on one side and the trapezoidal-shaped piece 32 is inserted in the gap between the other pair of faces 25 and 14. The piece 32 comprises two threaded holes each intended to receive a clamping screw denoted 36 which passes through the clamp 22 and therefore the head 36 bears on the top face of the clamp. When the screws 36 are tightened, the trapezoidal piece 32 which is captive tends to rise up and wedge between the faces 25 and 14. The result is an immobilisation and securing of the lug in its runner.

FIG. 6 illustrates one advantageous fixing mode. According to this mode, one face of the runner indicated by the specific reference 14', instead of being inclined like the support faces 14, forms a right angle with the bottom of the runner at this point, that is to say extends substantially radially, as shown by the figure. The corresponding lateral face 25' of the lug base 17 has the same orientation as the face 14'. The edge of the lug base 17 along the base 25' has an inclination and constitutes a lateral thrust ramp 38. The clamp device 22 in addition to the ramp 38 has a plate 39 angled in an appropriate fashion, which rests through an arm 40 on the external area of the runner and through its inclined arm 41 on the ramp 38. When the arm 39 in abutment on the bearing is clamped by the clamping screws 23 against the surface of the bearing, the arm 40 in abutment on the ramp 38 pushes the base 17 of the lug 16 in its runner on the opposite support face 14.

The fixing mode according to FIG. 6 has the advantage that the lug thus fixed will be wedged in its runner housing. The material of the clamp could be different from that of the bearing, if that proved necessary for its resistance to the forces. The opposite faces of the flange and lug could have serrations which would afford a better resistance to axial sliding.

It is clear from the above description that, by virtue of the systems for fixing the removable lugs which have just been described, the invention makes it possible to use alternators from conventional mass production for various types of motor vehicle. The invention makes it possible to adapt such an alternator to a given type of motor vehicle engine simply by locating fixing lugs in one or more runners angularly distributed around the front and/or rear bearings, by pivoting, per quarter in the case described of four runners, of the position of the electrical terminals and by appropriate axial positioning of the lugs in their runner. By virtue of the notching of the cooperating services, a fixing on lugs in their runner is obtained.

Naturally various modifications can be made to the invention as described above and depicted in the figures. Thus the number of protrusion areas on the periphery of the bearings and thus the number of runners could be different from four. It could also be envisaged fixing the lugs directly to the bearing by providing oblong holes in the parts or shrinking them on after positioning in their positions.

The invention particularly finds an advantage in the industry of the reconditioning of alternators of all origins allowing standard exchange consisting of making a worn appliance operational once again after having restored it, for example by cleaning, machining or replacing defective components. Thus a renovated electrical machine according to the invention allows the reconstruction of electrical machines which may be dedicated to applications other than the original ones. This electrical machine according to the invention makes it possible to reduce stocks at motor vehicle repairers since one and the same machine can be dedicated to several types of motor vehicle rather than limited to a single original application.

These alternators produced according to the invention therefore constitute "multi-application alternators".

Multi-application alternators can be equipped with magnetic circuits and regulation and rectifying systems making it possible to supply the voltage currently in use on 14-volt cars but also all other voltages such as 6, 28 or 42 volts. Likewise these alternators could supply direct or alternating current and fulfil all the additional functions associated with the voltage regulator.

Multi-application alternators, new or reconditioned, can be cooled by air or by a cooling liquid. Alternators cooled by air according to the invention are provided with internal or external ventilation. Alternators cooled by a cooling liquid comprise, in a manner known per se, double walls allowing the circulation of the cooling liquid. In this case, the holes for fixing the clamps will be blind rather than opening out.

The invention claimed is:

1. Rotary electrical machine, adaptable to various types of motor vehicle engines and comprising a casing enclosing a stator and a rotor whose spindle is supported in front and rear bearings and carries a pulley for driving by means of a belt, and removable lugs including a base part (17) and a top part (18) which are able to be mounted on the peripheral face of at least one of the bearings, each lug between two lateral support faces provided on this peripheral surface at a predetermined distance from each other in the peripheral direction of at least one of the bearings, wherein an aforementioned lateral support face (14, 14') is formed by the lateral face of an area of protruding material (12) on the external peripheral surface of at least one of the bearings, and wherein said base part (17) of said lug (16) is disposed between two lateral support faces (14, 14') opposite each other and belonging to two adjacent protruding areas (12), and wherein the two lateral support faces (14, 14') and the peripheral surface portion (21) of the machine, between the two lateral faces, constitute a runner for receiving and positioning said lug (16), and wherein at least one of the bearings (2, 3) carries on its external peripheral surface a multitude of protruding areas (12) delimiting a plurality of runners; and wherein the lug (16) is fixed in its positioning runner by a clamp device (22) bearing through one part on the base (17) of the fixing lug (16) and through another part on the adjacent protruding area (12).

2. Rotary electrical machine according to claim 1, wherein a protruding area (12) is formed as an assembly area for the alternator.

3. Rotary electrical machine according to claim 1, wherein said plurality of runners are distributed equidistantly.

4. Rotary electrical machine according to claim 1, characterised in that by means of the base part (17) the lug engages in the positioning runner and said top part (18) for providing an interface with the engine of the motor vehicle.

5. Rotary electrical machine according to claim 4, wherein the lug (16) is produced in the form of a single piece whose base (17) and top (18) parts are constituent parts.

6. Rotary electrical machine according to claim 4, characterised in that the base (17) and top (18) parts are separate pieces, able to be assembled for forming the lug (16).

7. Rotary electrical machine according to claim 1, characterised in that the base (17) of the lug (16) has a width less than the width of the runner intended for receiving it and in that the clamp device (22) comprises an element in the form of a wedge (28, 30, 32) which engages in a gap (27) created when the base (17) is pushed in abutment against the other support face (14) and provides by a wedging effect the immobilization of the base in its runner when the fixing screws (23) are tightened.

8. Rotary electrical machine according to claim 7, characterised in that the clamp device (22) has the general shape of an L, one arm of which forms the aforementioned wedge element (28) whilst the other arm comes into abutment on the protruding area (12) of the periphery of the bearing.

9. Rotary electrical machine according to claim 8, characterised in that the clamp device (22) comprises a piece forming a separate wedge (30) and a clamping plate (31) coming into abutment on the protruding area (12) and the piece forming a wedge (30).

10. Rotary electrical machine according to claim 8, characterised in that the clamp device (22) comprises a piece forming a wedge (32) of trapezoidal shape and a clamping plate (35) coming into abutment on the base (17) of the lug (16) and the protruding area (12) and in that the wedging effect is produced by a clamping screw passing through the plate and the wedge piece (32) and during tightening drawing the wedge piece (32) towards the plate.

11. Rotary electrical machine according to claim 8, characterised in that the clamp device (22) comprises a clamping plate (39), part of which (40) comes into abutment on the protruding area (12) whilst another part (41) comes into abutment on an inclined surface forming a ramp (38) configured so as to produce a force pushing the base (17) of the clamp (16) against the opposite runner support face (14) when the plate part (48) is clamped against the protruding area (12).

12. Rotary electrical machine according to claim 1, characterised in that a lug base (17) has, in the plane of its receiving runner, the general shape of a U so as to leave free, in its central part, the ventilation holes (9) that are formed in the peripheral wall of at least one of the bearings.

13. Rotary electrical machine according to claim 1, characterised in that a lug base (17) comprises an aperture (42) for leaving free the ventilation holes (9) that are formed in the peripheral wall of at least one of the bearings.

14. Rotary electrical machine according to claim 1, characterised in that the surface portions of the clamp device and of the lug base (17) which are in abutment on each other are notched (24, 26), the notches advantageously extending perpendicularly to the axis of the machine in order to improve the axial immobilization of the lugs (16).

15. Rotary electrical machine according to claim 4, characterised in that the face (20) for placing the base (17) of the lug (16) on the peripheral surface of at least one of the bearings has a curvature corresponding to that of the surface portion (21) of the bearing surface (5) between the two lateral support faces (14).

* * * * *